Feb. 3, 1959 W. P. METEVIA 2,871,571
FRICTION THIMBLE
Filed Oct. 8, 1956
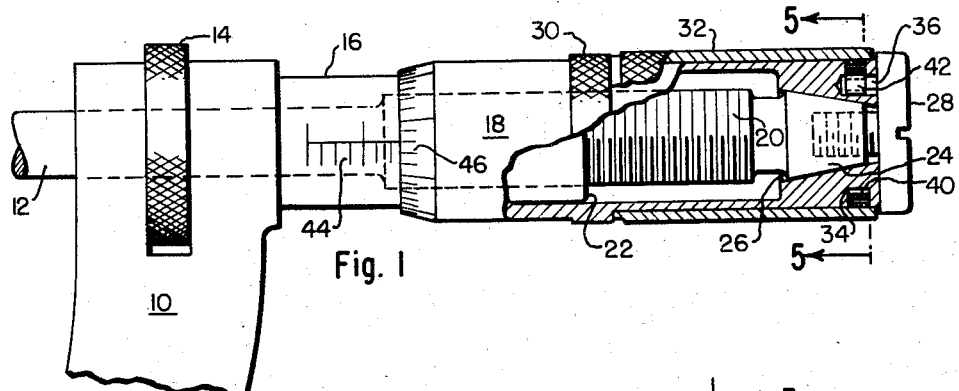
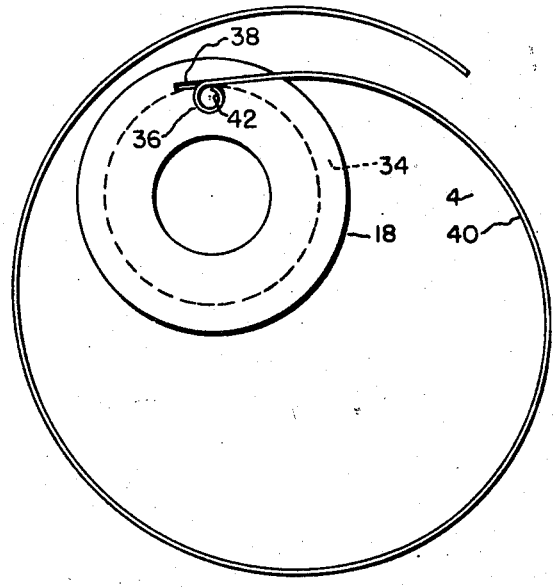
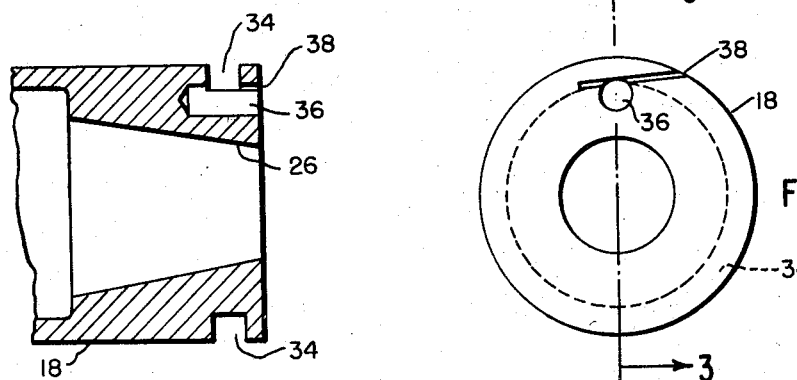
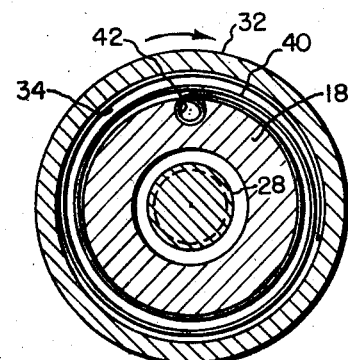
INVENTOR.
WILLIAM P. METEVIA
BY Kenway, Jenney, Witter & Hildreth
ATTORNEYS United States Patent Office 2,871,571
Patented Feb. 3, 1959

2,871,571

FRICTION THIMBLE

William P. Metevia, Athol, Mass., assignor to The L. S. Starrett Company, Athol, Mass., a corporation of Massachusetts Application October 8, 1956, Serial No. 614,543

4 Claims. (Cl. 33—164)

This invention relates to friction thimbles commonly employed on micrometers for limiting rotation of the spindle adjusting member to a predetermined torsion, thereby assuring uniform measuring contact pressure of the spindle with the anvil. Such friction mechanism commonly embodies an expandable spring disposed spirally within and in frictional contact with the thimble and having its inner end disposed within a slot in the spindle adjusting member, rotation of the thimble thereby rotating the member only up to the torsional force at which the thimble overcomes the friction and rotates on the member. In the construction heretofore known the mounting of the spring in the slot and the assembling of the thimble thereover have presented some difficulties, also in the assembling operation the spring is bent sharply at one end of the slot which causes spring breakage and the spring readily slides from the slot and becomes lost when the thimble is disassembled from the member. The primary object of my invention resides in the production of an improved assembly of this nature in which these objections are eliminated.

These and other features of the invention will be best understood and appreciated from the following description of a preferred embodiment thereof selected for purposes of illustration and shown in the accompanying drawing in which, Fig. 1 is a fragmentary elevation, partly in longitudinal section, of a micrometer embodying the invention, Fig. 2 is an enlarged outer end view of the spindle adjusting member, Fig. 3 is a fragmentary sectional view thereof taken on line 3—3 of Fig. 2, Fig. 4 is a view like Fig. 2 and showing one end of the spring assembled on the spindle adjusting member, and Fig. 5 is a sectional view taken on line 5—5 of Fig. 1.

In the drawing 10 indicates the frame of a micrometer having a spindle 12 mounted therein and provided with a lock nut 14. Rotatably disposed coaxially on the barrel 16 of the micrometer is a sleeve-like spindle adjusting member 18. The reduced inner portion of the spindle is mounted to slide longitudinally in the frame 10 and its larger outer portion 20 is in threaded engagement with a nut 22 carried by the barrel 16. The outer end 24 of the spindle is of conical configuration and is engaged by a like conical surface 26 within the outer end of the spindle adjusting member 18. A cap screw 28 threaded into the outer end of the spindle 12 and disposed over the member 18 secures the spindle and member together, thereby uniting the spindle and member for rotary and longitudinal movement as a unit.

An intermediate portion of the spindle adjusting member 18 is knurled at 30 and the portion outwardly therefrom is of reduced diameter and supports coaxially thereon a knurled cylindrical shell 32. The outer end of the member 18 has a portion of reduced diameter comprising an annular channel 34 located adjacent to but inwardly of the outer end of the member. The member is recessed by a bore 36 extending inwardly from its outer end and also by a slot 38 extending inwardly, both intersecting the channel 34. A leaf spring 40 has one end bent to circular form and providing a bead 42, and the bore 36 and slot 38 are adapted to receive the bead and spring therethrough to a position within the channel 34. The bead is of a size substantially fitting within the bore and the opening from the bore to the channel is preferably smaller than the bead, thus preventing lateral escape of the bead from the bore.

In assembling the parts to the relation shown in Fig. 1, the spring is first mounted on the member as illustrated in Fig. 4. The spring is then wound to spiral relation within the channel 34 and the shell 32 is inserted thereover and secured by the cap screw 28. The barrel 16 and the inner beveled end of the member 18 are indexed in the well known manner at 44 and 46.

It will now be apparent that the expanding of the spring 40 into contact with the inner cylindrical wall of the shell 32 provides a frictional connection between the shell 32 and member 18 whereby clockwise rotation of the shell as indicated by the arrow in Fig. 5 rotates the member 18 with a predetermined torsion assuring uniform measuring contact pressure of the spindle 12. Disposing of the bead 32 within the bore 36 provides a permanent anchoring of the spring to the member 18, thereby preventing loss of the spring when the parts are disassembled, and the tangential relation of the spring at the bead eliminates any sharp bending or breaking of the spring. It is particularly noted that the bead 42 within the bore 36 together with the restricted passage from the bore to the annular channel 34 provides the sole anchor for the spring and permits free adjustment of the spring to said tangential relation, thereby automatically positioning the spring to its proper tangential position and eliminating any bending or breaking of the spring. The bead is conveniently and economically produced merely by bending an end of the spring and the assembling of the spring and its cooperating member 18 is a relatively simple and economical operation.

Having thus disclosed my invention what I claim as new and desire to secure by Letters Patent is:

1. A friction thimble comprising in combination a cylindrical member having a concentric portion of reduced diameter, a tubular sleeve disposed rotatably and concentrically on said member, and a spiral spring disposed about the said reduced diameter portion of the member within and in resilient frictional engagement with said sleeve and having a bead on its inner end disposed within a recess in said member and laterally of its longitudinal axis and anchoring the spring to the member, said bead being of circular form and the spring extending tangentially therefrom about said reduced diameter portion of the member.

2. The friction thimble defined in claim 1 in which said bead comprises an end portion of the spring bent to circular form.

3. A friction thimble comprising in combination a cylindrical member having a concentric portion of reduced diameter provided with a bore therein adjacent to its periphery and open to the periphery through a restricted passage, a tubular sleeve disposed rotatably and concentrically on said member, and a spiral spring extending through said passage and surrounding said reduced diameter portion of the member within and in resilient frictional engagement with the inner cylindrical wall of said sleeve and having a bead on its inner end larger than said passage and disposed within the bore and anchoring the spring to the member, the bead within said bore together with said restricted passage providing the sole anchor for the spring and permitting free adjustment of the spring to a position tangentially of said periphery.

4. The friction thimble defined in claim 3 in which said reduced diameter portion of the member is disposed within an annular channel in the member located adjacent to but inwardly of one end of the member, said recess and an intersecting slot in the member being open to said one end of the member for receiving the spring and bead and permitting passage thereof into the said recess and reduced diameter portion of the member.

References Cited in the file of this patent

UNITED STATES PATENTS 2,665,490     Zelnick _____ Jan. 12, 1954

FOREIGN PATENTS 603,097     Great Britain _____ June 9, 1948